(No Model.)

J. BECKER.
APPARATUS FOR PURIFYING LIQUORS BY ELECTROLYSIS.

No. 493,809. Patented Mar. 21, 1893.

WITNESSES:
F. L. Ourand
Alex Mahon

INVENTOR:
John Becker
By G. J. Bond
Attorney.

UNITED STATES PATENT OFFICE.

JOHN BECKER, OF KYMULGA, ALABAMA.

APPARATUS FOR PURIFYING LIQUORS BY ELECTROLYSIS.

SPECIFICATION forming part of Letters Patent No. 493,809, dated March 21, 1893.

Application filed March 12, 1892. Serial No. 424,694. (No model.)

*To all whom it may concern:*

Be it known that I, JOHN BECKER, a citizen of the United States, residing at Kymulga, in the county of Talladega and State of Alabama, have invented certain new and useful Improvements in Apparatus for Purifying Liquors by Electricity; and I do hereby declare the following to be a full, clear, and exact description of the invention, such as will enable others skilled in the art to which it appertains to make and use the same.

My invention relates to that class of apparatus for aging spirituous or vinous liquors by subjecting them to the action of an electric current, whereby the fusel oils or other obnoxious or deleterious matter is removed, and—

My invention consists in a novel construction of apparatus wherein the tank for containing the liquors is made of zinc and forms the positive electrode with a mat of copper wire to form the negative electrode with the mat covered with asbestus or similar material, and submerged into the tank whereby the impurities or deleterious matter contained in the spirituous or vinous liquors is drawn and held by the cloth, or precipitated to the bottom in the form of sediment, and by the action of the electric current and the resistance offered thereto by the liquor, cause the same to have the same qualities as that obtained by age in the ordinary manner, and the invention further consists in certain details in the construction and arrangement of parts all as hereinafter explained.

Figure 1:
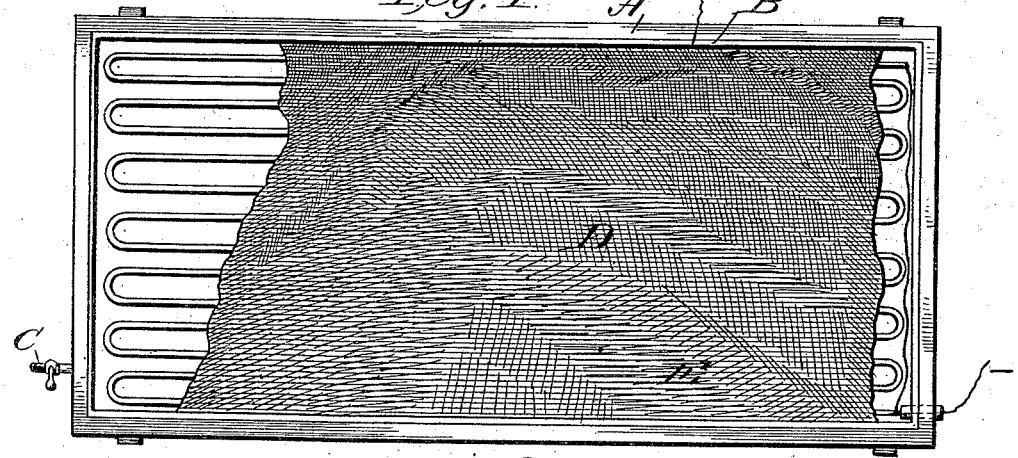
Figure 2:
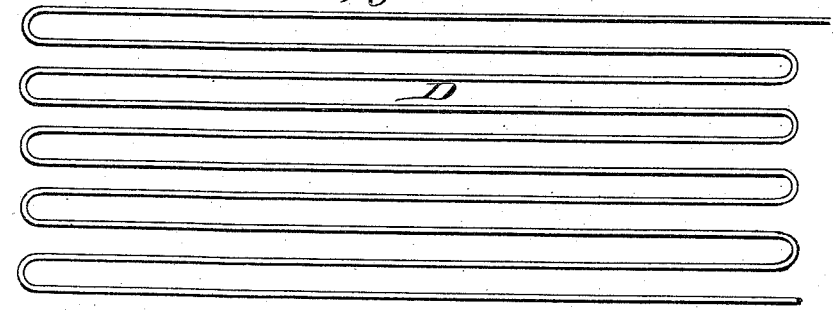
Figure 3:
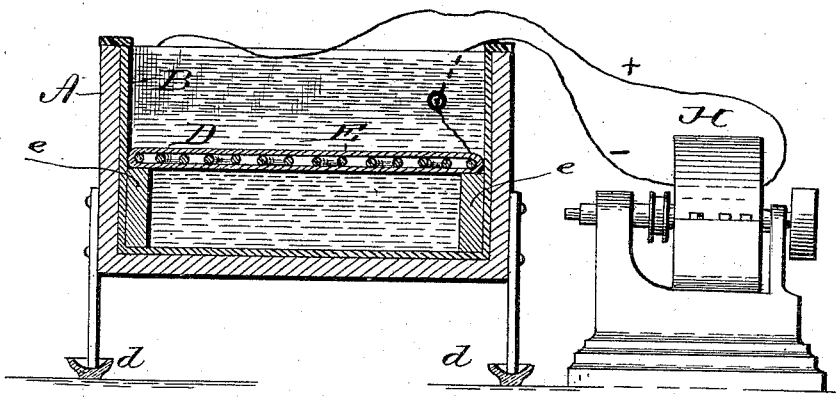

In the accompanying drawings—Figure 1 is a plan or top view of the box or tank having the zinc lining to form the positive electrode and which is to contain the liquor to be acted upon showing the mat formed from a continuous wire and constituting the negative electrode. Fig. 2, shows the mat. Fig. 3 is a view in cross section of the tank, the mat and asbestus cloth covering, and showing connection with a dynamo.

The box A, is of a size to correspond to the amount of liquor intended to be acted upon in the present instance, say, constructed to contain one barrel (forty gallons) wherein the tank would be forty inches long, fifteen inches wide, and six inches deep, all in the clear. This tank is lined with zinc B, closely fitting the tank, having the edges bent over and tacked on the edges of the tank and forming the positive electrode. The box rests upon legs insulated in any preferred way, preferably by being set in glass cups *b*, the lengths of the legs being about equal to the height of an ordinary bucket so as to facilitate the drawing off of the sediment from the tank, said tank being provided with a cock C, for that purpose.

The zinc tank B constitutes the positive electrode within which is placed the mat D which forms the negative electrode, and is composed of heavy copper wire bent in serpentine form to fit loosely within the tank and having both ends of the wire terminating at the same end of the tank and connecting with the same pole of the dynamo.

The mat D is covered with asbestus or other suitable cloth E the bent and the raw edges of which come in contact with the zinc lining of the tank at all sides. The mat thus constructed is placed in the tank so as to rest upon the wooden blocks, *e*, of equal height, about midway between the bottom of the tank and the upper edges thereof.

The zinc tank which forms one, or the positive electrode, is connected to one wire of the dynamo, as H, while the two ends of the mat or negative electrode are connected to the other wire, and as the current passes over the mat from one electrode to the other the liquor in which it is submerged is subjected to the full and uniform action of the electric current the effect of which is to destroy deleterious matter, giving the liquor a quality similar to that attained by aging, and at the same time any solid impurities are precipitated to the cloth and held there.

In practice it has been demonstrated that a six to eight voltage current from a dynamo is the best where the amount of liquor to be acted upon and the size of tank is as before stated, but a greater or less voltage may be employed if found desirable. After the cloth has taken up all the impurities it can contain, it may be removed and cleansed in a manner that will be readily understood.

By making the zinc lining form the positive electrode, and the negative electrode formed of a continuous wire, the electric current is exposed to a less liquid resistance and consequently the action is much quicker and more thorough than where single solid electrodes are employed to act on a great body of liquor.

Having now described my invention, what I claim as new, and desire to secure by Letters Patent, is—

1. In an apparatus for purifying and aging liquors a tank, the lining of which, forms the positive electrode, and a wire mat placed horizontally in the tank and forming the negative electrode, the said lining and mat being connected with the opposite poles of an electric battery in the manner and for the purposes set forth.

2. In an apparatus for purifying and aging liquors a tank the lining of which forms the positive electrode, and a cloth-covered wire mat placed horizontally in the tank and forming the negative electrode, the said lining and mat being connected with the opposite poles of an electric battery for the purposes described.

In testimony whereof I affix my signature in presence of two witnesses.

JOHN BECKER.

Witnesses:
WM. ASHLEY,
RICHARD GIPSE.